(12) United States Patent
Nyberg

(10) Patent No.: US 7,246,839 B1
(45) Date of Patent: Jul. 24, 2007

(54) HARD TONNEAU COVER WITH CARRYING RACK

(76) Inventor: Donald E. Nyberg, 18101 James Rd., Villa Park, CA (US) 92861

( * ) Notice: Subject to any disclaimer, the term of this patent is extended or adjusted under 35 U.S.C. 154(b) by 104 days.

(21) Appl. No.: 11/154,684

(22) Filed: Jun. 17, 2005

(51) Int. Cl.
B60P 7/02 (2006.01)

(52) U.S. Cl. ............... 296/100.06; 296/3; 296/100.01; 296/100.02

(58) Field of Classification Search .......... 296/100.01, 296/100.02, 100.06, 100.08, 100.17, 3
See application file for complete search history.

(56) References Cited

U.S. PATENT DOCUMENTS

| | | | |
|---|---|---|---|
| 4,057,281 A | 11/1977 | Garrett | |
| 4,531,775 A * | 7/1985 | Beals | 296/100.06 |
| 6,254,169 B1 * | 7/2001 | Arthur | 296/100.07 |
| 6,340,106 B1 | 1/2002 | Dutton | |
| 6,382,698 B1 | 5/2002 | Harrell | |
| 6,527,326 B2 | 3/2003 | Henderson | |
| 6,616,210 B1 | 9/2003 | Massey | |
| 6,644,704 B1 | 11/2003 | Nyberg | |
| 6,851,738 B1 | 2/2005 | Schmeichel et al. | |
| 6,883,855 B2 | 4/2005 | Chverchko et al. | |
| 2003/0047958 A1 * | 3/2003 | Yarbrough et al. | 296/100.06 |

* cited by examiner

Primary Examiner—Lori L. Lyjak
(74) Attorney, Agent, or Firm—Gordon K. Anderson

(57) ABSTRACT

A hard tonneau cover with a carrying rack (10) for enclosing a pick-up truck bed (24) consists of a roadside frame (20) and a curbside frame (22) with each frame hinged to a side wall of the pick-up truck bed. Each frame includes a top panel (26) and the frames pivot upwardly and outwardly in a clam shell manner for opening. The carrying rack is formed within the cover by utilizing cargo rack arms (42 and 44) that pivot forward above the truck cab and removable cross bars (52, 54 and 56), positioned between the opened roadside and curbside frames provide means for transporting elongated objects above the pick-up truck cab and bed. A gas spring strut (64) is attached between the roadside and curbside frame and the truck bed for maintaining the frames in an open vertical position. A second embodiment duplicates the forward carrying rack and is located at the rear for carrying extended length articles.

20 Claims, 7 Drawing Sheets

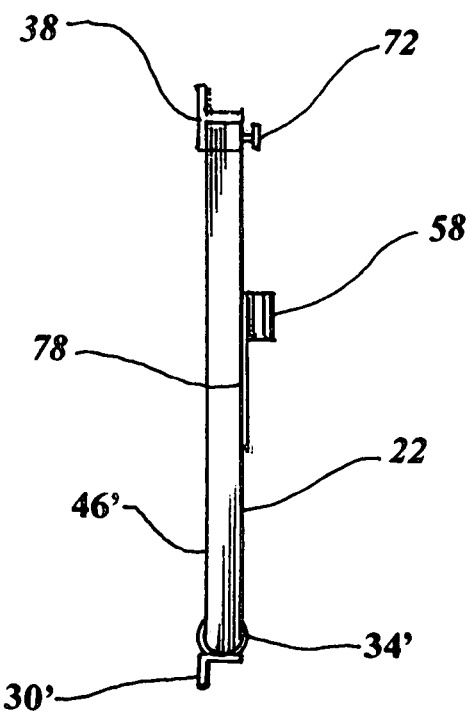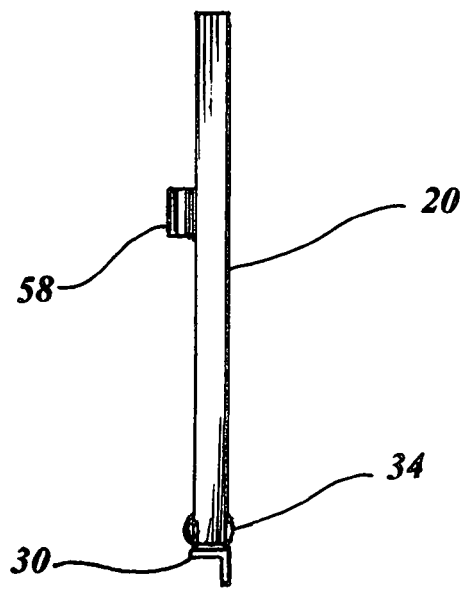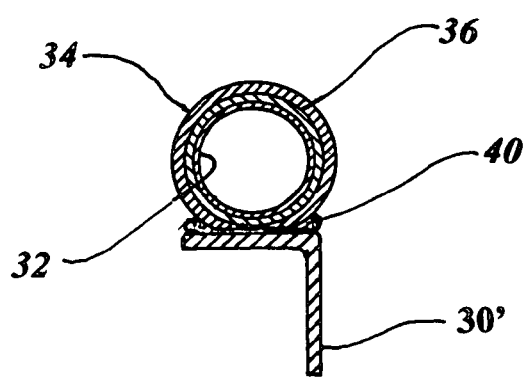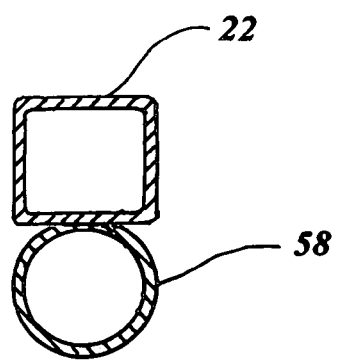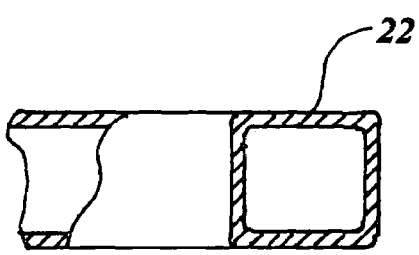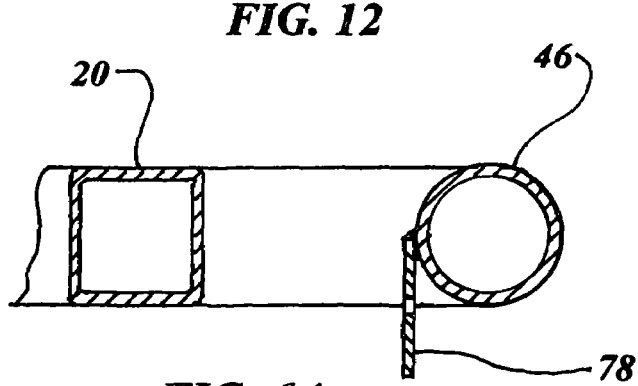
FIG. 9
FIG. 10
FIG. 11
FIG. 12
FIG. 13
FIG. 14

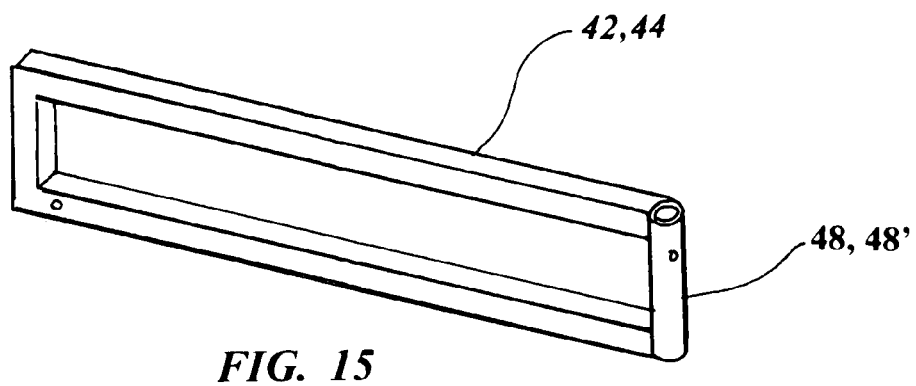
FIG. 15
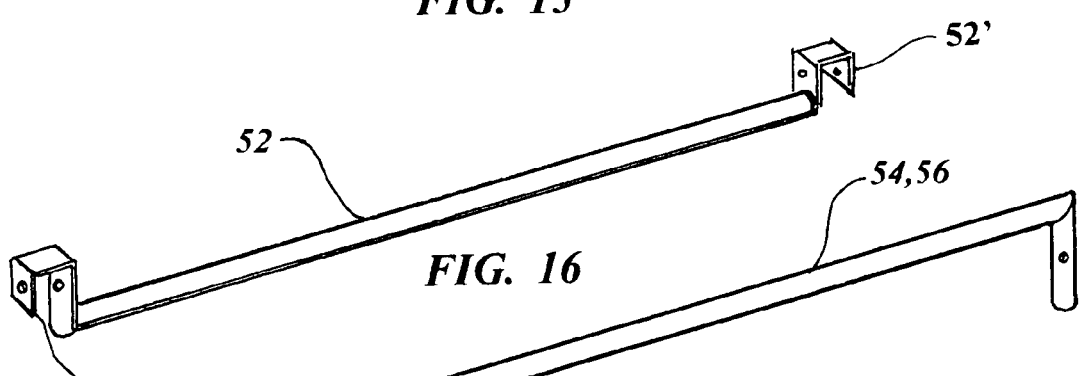
FIG. 16
FIG. 17
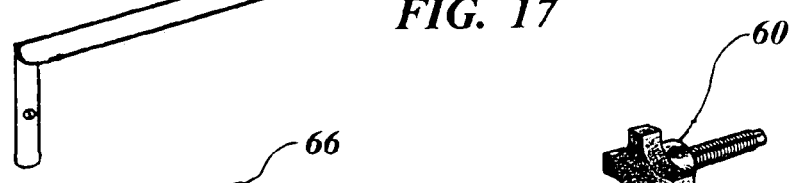
FIG. 20
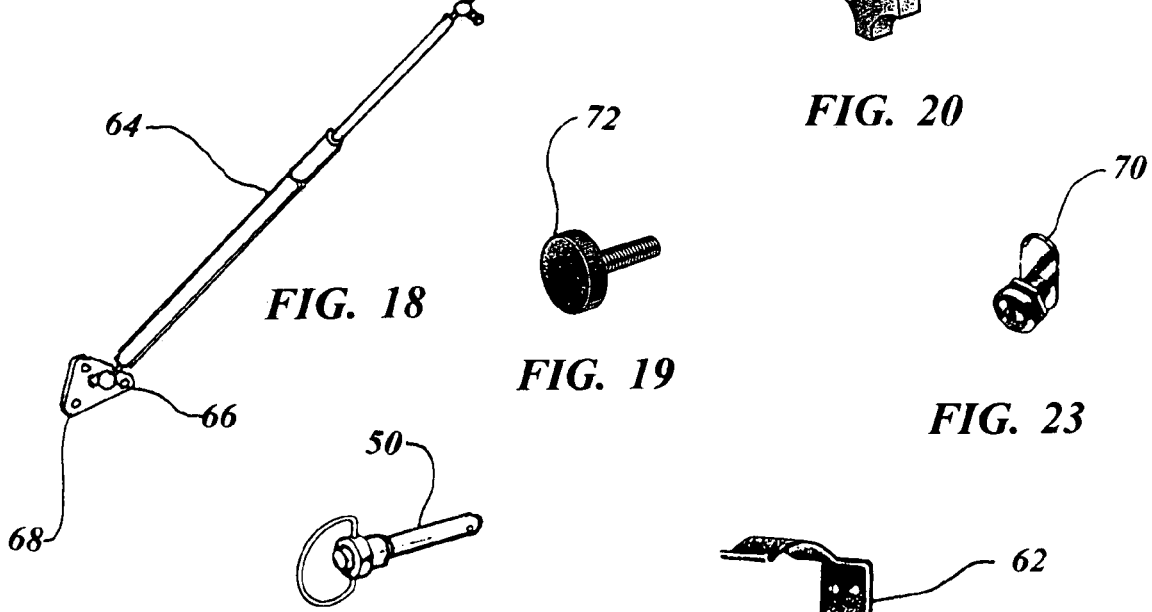
FIG. 18
FIG. 19
FIG. 23
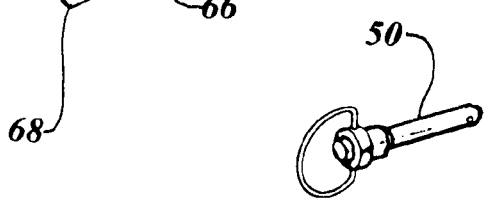
FIG. 21
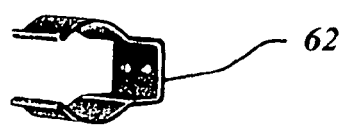
FIG. 22

HARD TONNEAU COVER WITH CARRYING RACK

TECHNICAL FIELD

The present invention relates in general to tonneau covers and also carrying racks for extended objects. More specifically to a pick up truck hard clam-shell tonneau cover in combination with an integral carrying rack

BACKGROUND ART

Previously, many types of tonneau covers and cargo carriers for pick-up trucks have been used in endeavoring to provide an effective means to protect the interior of the truck bed and provide carrying capabilities for long objects.

The prior art listed below did not disclose patents that possess any of the novelty of the instant invention; however the following U.S. patents are considered related:

| Patent Number | Inventor | Issue Date |
| --- | --- | --- |
| 4,057,281 | Garrett | Nov. 8, 1977 |
| 6,340,106 | Dutton | Jan. 22, 2002 |
| 6,382,698 | Harrell | May 7, 2002 |
| 6,527,326 | Henderson | Mar. 4, 2003 |
| 6,644,704 | Nyberg | Nov. 11, 2003 |
| 6,616,210 | Massey | Sep. 9, 2003 |
| 6,851,738 | Schmeichel et al. | Feb. 8, 2005 |

Garrett in U.S. Pat. No. 4,057,281 teaches a detachable and foldable carrying rack for a pick-up truck that extends over the cab. Posts project upwardly from the bed and have base plates with brackets pivotally connected to the legs permitting the legs to be folded against the framework for storage when the rack is removed from the support pads.

My U.S. Pat. No. 6,644,704 (Nyberg) is for an expandable rack for a truck bed that utilizes folding legs that are connected to an upper frame. The legs allow the upper frame to retract completely within the truck bed compartment so as not to protrude over the edge of the truck sidewalls when not in use. The invention provides an unobstructed truck bed having no portion of the rack except the legs occupying space on the bed floor. A single person may easily convert the rack from a retracted position to a deployed position.

Massey in U.S. Pat. No. 6,616,210 discloses a truck bed cover hingeably attached to a toolbox. A hydraulic cylinder is use to raise and lower the cover with the cylinder shifting position so as not to consume useful space within the bed. When closed the cylinder pulls the cover tightly against the truck body.

Schmeichel et al. in U.S. Pat. No. 6,851,738 teaches an apparatus for attaching a flexible cover to the cargo box of a pick-up truck. A support frame attaches to the perimeter of the cargo box with a locking member attached to an end plate. The end plate is retained in the fixed stretching position by a locking member.

U.S. Pat. No. 6,883,855 issued to Chverchko et al. discloses a hard cover made of at least two panels hinged together in a removable manner to at least one secured panel permitting easy access to the truck bed with attachment provided that does not require drilling into the bed.

For background purposes and as indicative of the art to which the invention is related reference may be made to the remaining cited patents issued to Dutton in U.S. Pat. No. 6,340,106, Harrell in U.S. Pat. No. 6,382,698 and Henderson in U.S. Pat. No. 6,527,326.

DISCLOSURE OF THE INVENTION

In the past decades the popularity of pick-up trucks has increased in this country for the small, mid sized and full sized vehicles with even luxury vehicle manufactures marketing pick-up trucks for the up-scale public. The result of this almost universal acceptance has developed a market for covers that enclose the truck bed for not only utility of locking items securely within the bed but for the aesthetics of the vehicle itself.

A myriad of so called soft covers have been developed using vinyl or other leather textured thermoplastic some with arched cross bows and many with spring loaded rollers however hard covers are also becoming very popular. The hard covers are usually one piece of metal, fiberglass or thermoplastic hinged on the forward end or are formed in separate but connecting sections that sandwich together adjacent to the cab. The sectioned type retracts and are stored together one on top of the other with some even having a remote electric opening and closing capabilities.

The utility of a pick-up truck has also included the ability to haul long material such as pipes, tubes, lumber, rebar and ladders etc. or sporting equipment including canoes, kayaks and the like in overhead cargo racks.

The need has existed particularly for contractors and builders as well as sportsman and the like to utilize the pick-up trucks full capability for both of the above functions simultaneously which has previously been unattainable or at least with considerable difficulty.

It is therefore the primary object of the invention to provide a hard tonneau cover and integral carrying rack does not require removal while permitting full bed utilization. This object is fulfilled by the use of a clam shell type of hard cover that is hinged on the roadside and curbside of the truck bed and split in the middle with the sides pivoting upward until they are vertical and remain in this position by the use of gas spring struts. The roadside and curbside frames are each covered with a top panel and include a pivoting front cargo rack arm and removable cross bars that are manually placed between the extended arms and frames creating a cargo rack extending above the truck cab.

An important object of the invention permits tall objects such as furniture, appliances etc. to be hauled within the entire bed when the carrying rack is stored. The invention does not loose any space as does prior art which requires space for the retracted cover or limited accessibility with the forward hinged hard cover.

Another object of the invention takes less or at least no more room than conventional covers and provides a smooth hard top that looks high-quality, is strong and robust while including gaskets for protection from the environmental elements.

Still another object of the invention is that the internal bed space is completely accessible and the cover is easy to unlock and open by one person from the rear of the pick-up truck Yet another object of the invention is that each cover is flat and unencumbered providing an ideal surface for permitting a logo or some type of advertising to be displayed and highly visible from both sides.

A further object of the invention is that the preferred material for its construction is aluminum which is ideal since it is light weight and not subject to the same deleterious corrosion found in ferrous metals.

An important object of the invention is that the pick-up truck tailgate may be opened and lowered without the necessity of raising the cover or unlocking any cover fasteners which provides access for small items to be stored and retrieved easily.

A final object of the invention is that if particularly long items are to be stored on the cargo rack a second embodiment of the invention provides a rear extension that utilizes a duplicate of the front cargo rack arm and an additional cross bar.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 9 is a front end view taken along lines 9–9 of FIG. 7.

FIG. 10 is a rear end view taken along lines 10–10 of FIG. 8.

FIG. 11 is a cross sectional view taken along lines 11—11 of FIG. 7.

FIG. 12 is a cross sectional view taken along lines 12—12 of FIG. 7.

FIG. 13 is a cross sectional view taken along lines 13—13 of FIG. 7.

FIG. 14 is a cross sectional view taken along lines 14—14 of FIG. 8.

FIG. 15 is a partial isometric view of one of the front cargo rack arms completely removed from the invention for clarity.

FIG. 16 is a partial isometric view of the removable front cross bar completely removed from the invention for clarity.

FIG. 17 is a partial isometric view of the first front cargo rack arm completely removed from the invention for clarity with the second front cargo rack arm an exact duplicate.

FIG. 18 is a partial isometric view of one of the gas spring struts completely removed from the invention for clarity.

FIG. 19 is a partial isometric view of one of the leveling feet completely removed from the invention for clarity.

FIG. 20 is a partial isometric view of one of the hand knobs completely removed from the invention for clarity.

FIG. 21 is a partial isometric view of one of the quick release pins completely removed from the invention for clarity.

FIG. 22 is a partial isometric view of one of the spring clips completely removed from the invention for clarity.

FIG. 23 is a partial isometric view of a typical cam lock completely removed from the invention for clarity.

BEST MODE FOR CARRYING OUT THE INVENTION

The best mode for carrying out the invention is presented in terms of a preferred and a second embodiment which are basically the same except the second embodiment incorporates a duplicated rack arm and rack cross bar in the rear thereby increasing its utility to carry extended length articles.

Figure 1:
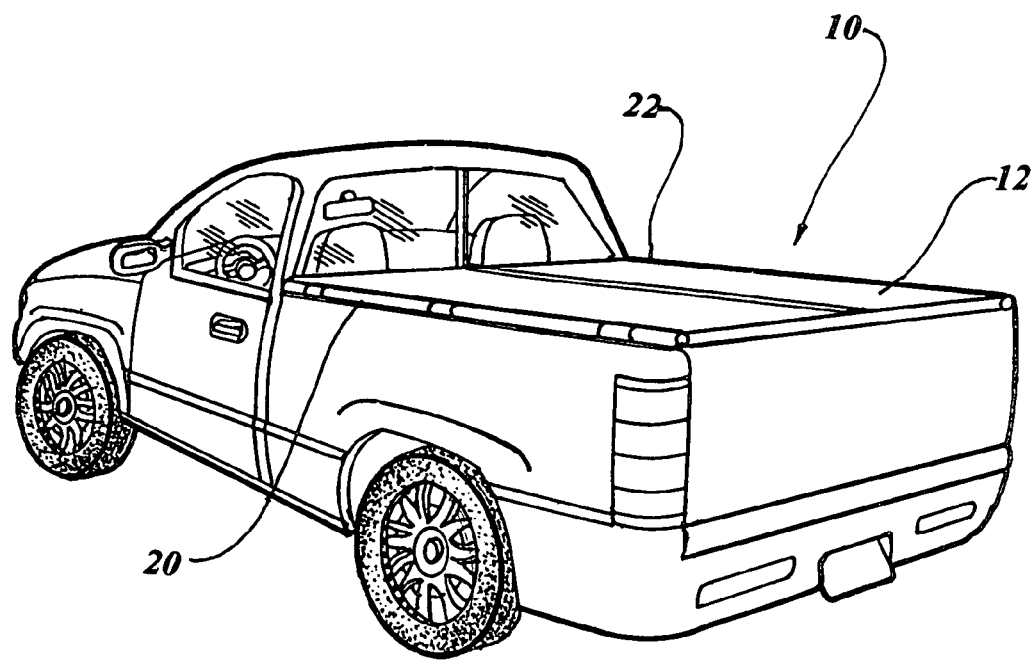
FIG. 1 is a partial isometric view of the hard tonneau cover with a carrying rack mounted on a pick-up truck with the cover closed in the preferred embodiment.
Figure 2:
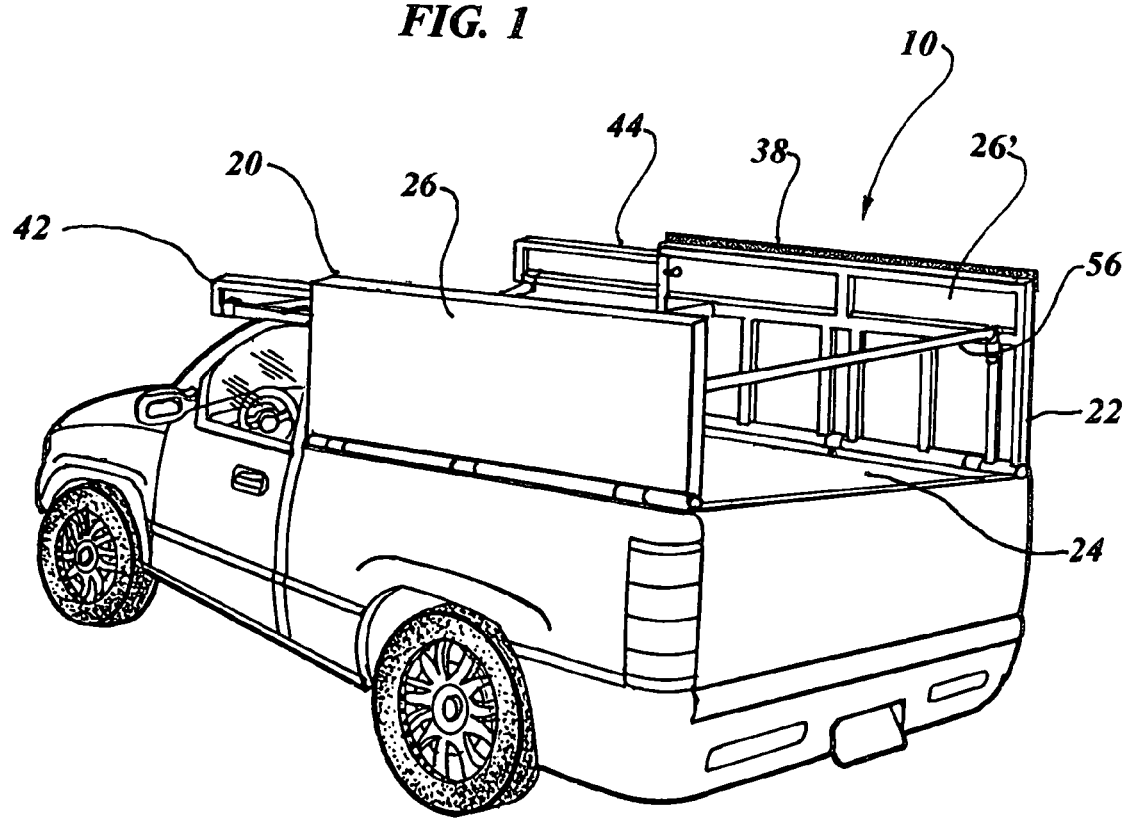
FIG. 2 is a partial isometric view of the hard tonneau cover with a carrying rack mounted on a pick-up truck illustrating the cover open, the front cargo rack arms extended and cross bars attached.
Figure 3:
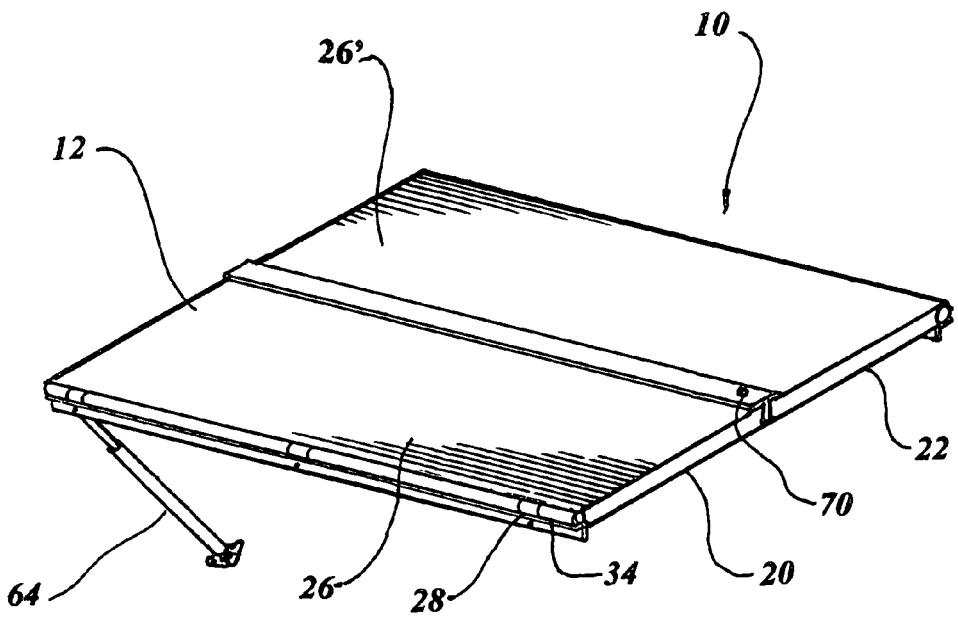
FIG. 3 is a partial isometric view of the hard tonneau cover and carrying rack in the closed position of the preferred embodiment removed from a pick-up truck.

The preferred embodiment for a hard tonneau cover with a carrying rack 10 is shown in FIGS. 1 thorough 23 and is comprised basically of a paneled top assembly 12 defined as consisting of a roadside frame 20 and a curbside frame 22 with each frame hinged to a side wall of a pick-up truck bed 24 as illustrated in FIGS. 1 and 2. The paneled top 12 assembly separates and pivots upwardly in a clam shell manner when each frame 20 and 22 are manually opened which is depicted best in FIG. 2. Both the hinged roadside frame 20 and the hinged curbside frame 22 are covered with a top panel 26 and 26' respectively. As illustrated in FIGS. 1 and 2, the roadside frame 20 and curbside frame 22 are mated parallel with each other and pivotally lay on top of the pick-up truck bed 24 for closure and protection of items stored within.

Figure 5:
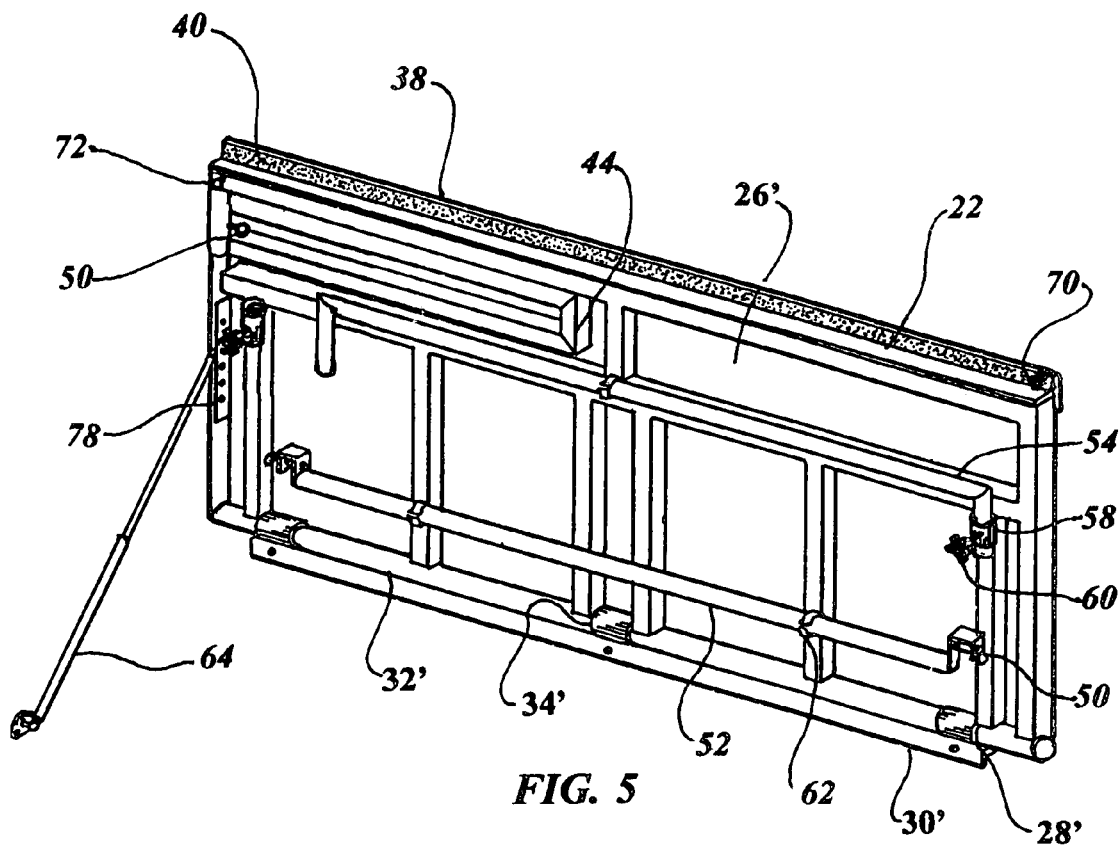
FIG. 5 is a partial isometric view of the inside surface of the hinged curbside frame with the front cargo rack arm and cross bars in the stowed position.
Figure 6:
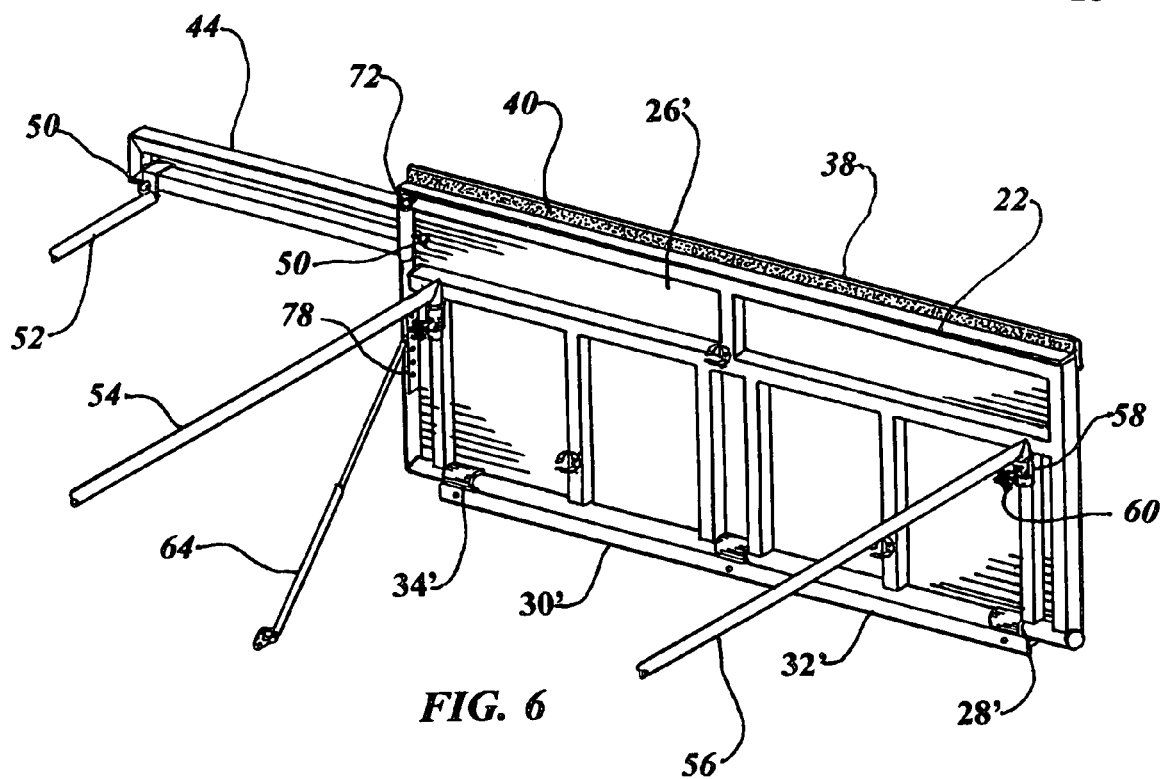
FIG. 6 is a partial isometric view of the inside surface of the hinged curbside frame with the front cargo rack arm and cross bars in the extended position.
Figure 7:
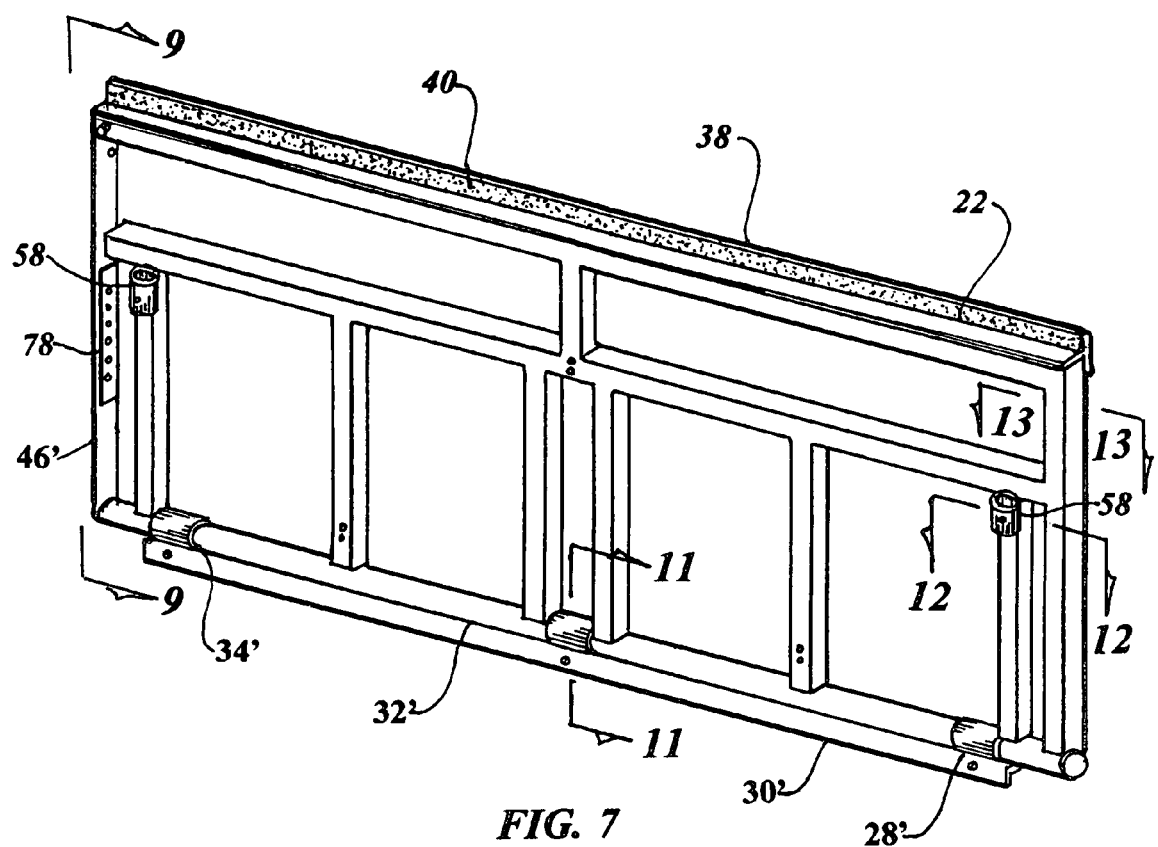
FIG. 7 is a partial isometric view of the inside surface of the hinged curbside frame only, completely removed from the invention for clarity.
Figure 8:
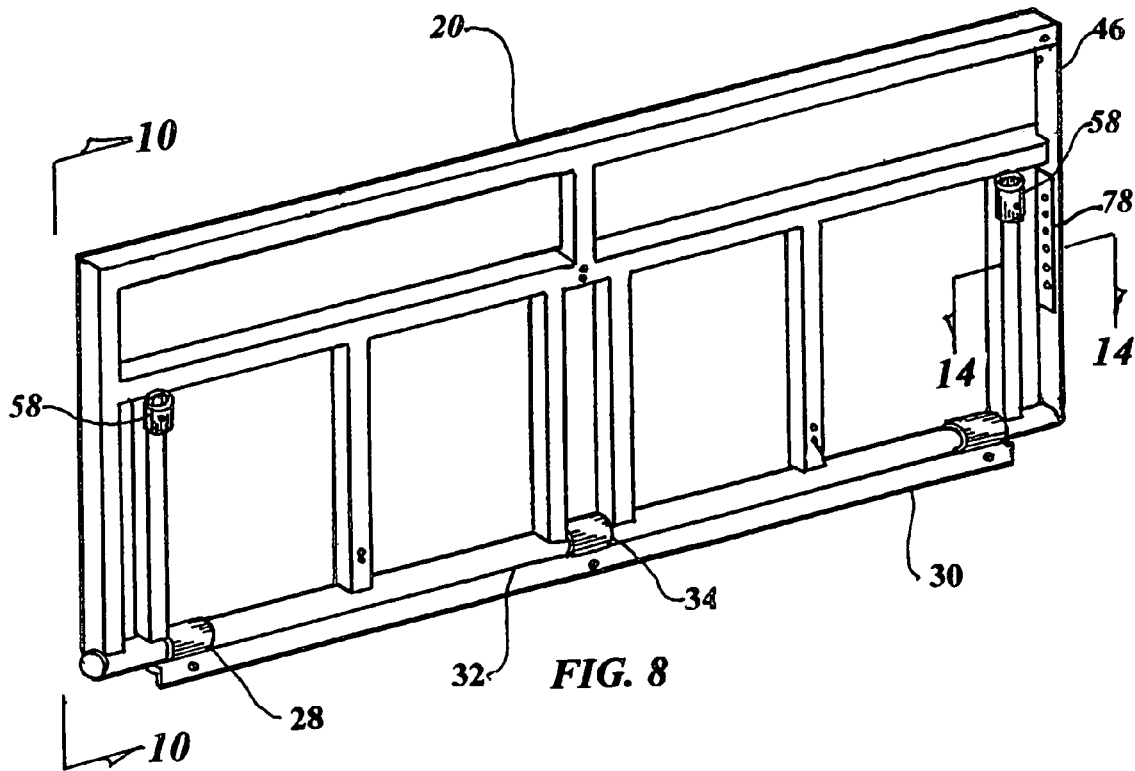
FIG. 8 is a partial isometric view of the inside surface of the hinged roadside frame only, completely removed from the invention for clarity.

The roadside frame 20 and curbside frame 22 each consist of a rigid structural weldment of hollow square and round shapes made of a material such as aluminum or steel and are pictorially represented in their assembled form in FIGS. 1–6 and in their basic structure in FIGS. 7 and 8. The preferred material is aluminum which was selected for its light weight and corrosion resistance characteristics, however any other applicable material may be chosen and still be within the scope of the invention.

The roadside frame top panel 26 and curbside frame top panel 26' are made of a material such as sheet aluminum, sheet steel, thermoplastic or fiberglass with aluminum also being preferred. The top panels 26 and 26' are permanently attached to the corresponding frame 20 and 22 with any attaching means well known in the art such as welding, riveting, screwing, bolting and the like. It is preferred to use either the same basic metallic material for both the frames and panels or at least a compatible dissimilar material to preclude electrolytic corrosion.

Figure 4:
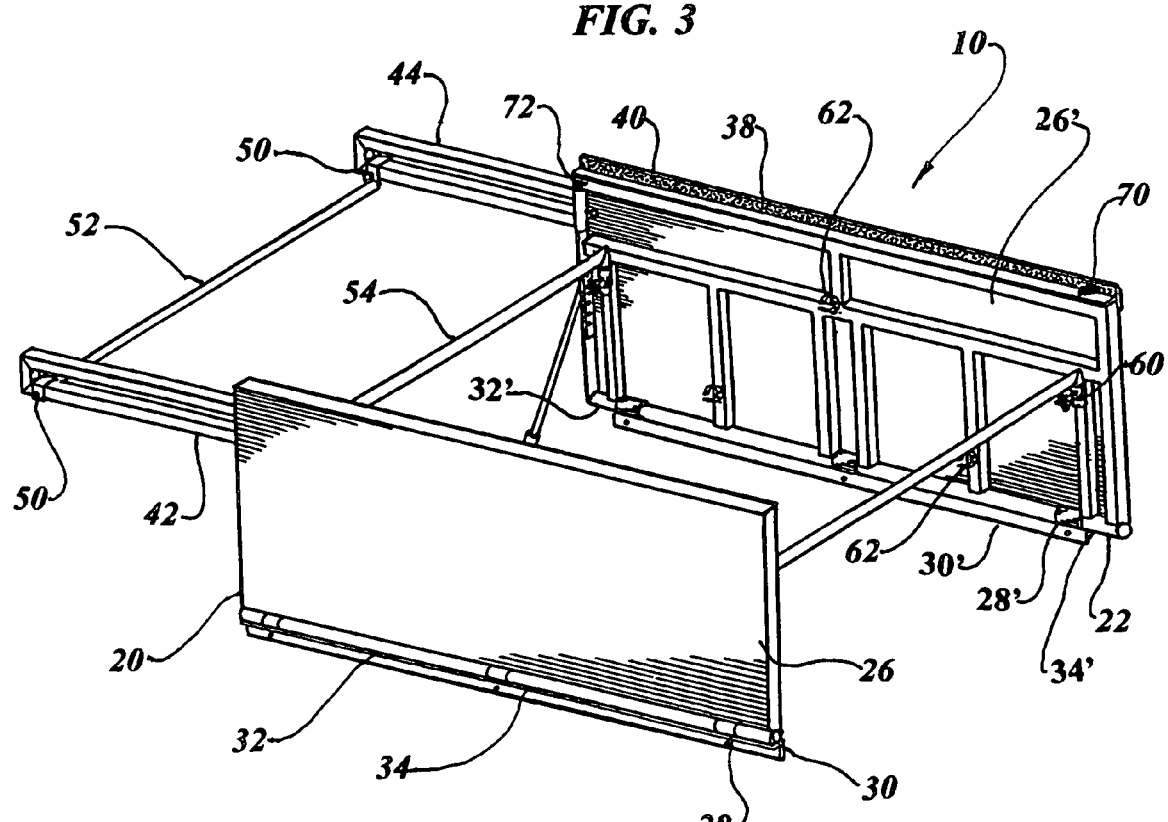
FIG. 4 is a partial isometric view of the hard tonneau cover and carrying rack illustrating the cover open, the front cargo rack arms and cross bars extended removed from a pick-up truck.

Hinges 28 and 28' are integrally formed within an outside edge portion of the roadside frame 20 and curbside frame 22 which are attached to a corresponding truck bed side rail 30 and 30'. The hinges 28 and 28' are formed with roadside frame 20 and curbside frame 22 each having a round tubular outside frame member 32 and 32' creating their own hinge pin. A plurality of tubular hinge bodies 34 and 34' are permanently attached to the truck bed side rail 30 and 30' forming a hinge leaf each having a bronze bushing 36 and 36' therebetween, as illustrated in FIG. 11. With this arrangement the paneled top assembly 12 is free to rotate in the above mentioned clam shell manner into a vertical parallel position as shown in FIGS. 2 and 4.

The hinged curbside frame 22 includes an overlapping tee shaped sealing member 38 that is attached to its inboard longitudinal edge and is used to interface with the road side frame 20 to provide a water tight closure therebetween. Weather stripping 40 is attached to the underside of the protruding leg of the sealing member 38 as shown in FIG. 7.

A first front cargo rack arm 42 is pivotally attached to the roadside frame 20 and a second front cargo rack arm 44 is likewise pivotally attached to the curbside frame 22. This arrangement permits each arm to extend parallel with its corresponding road side frame 20 or curbside frame 22 when the frames are opened upward into a vertical position as shown in FIGS. 2 and 4.

Each front cargo rack arm 42 and 44 include attachment means, which consists of each roadside frame 20 and curbside frame 22 having a round tubular front member 46 and 46'. The first cargo rack pivotal arm 42 and second cargo rack pivotal arm 44 each have a hollow tubular end 48 and 48' configured to slip over the round tubular front member 46 and 46' of the respective roadside and curbside frame 20 and 22 permitting the cargo rack arms 42 and 44 to rotate in a pivotal manner. FIGS. 7 and 8 illustrate the round tubular front member 46 and 46' while FIG. 15 shows the hollow tubular end 48 and 48' of the first cargo rack pivotal arm 42 and second cargo rack pivotal arm 44. A quick release pin 50 is used for locking the first pivotal front cargo rack arm 42 and the second pivotal front cargo rack arm 44 to the corresponding curbside frame 22 and roadside frame 20 in the desired position.

A removable front rack cross bar 52 is stored on the curbside frame 22, a removable middle rack cross bar 54, is stored on the curbside frame 22, and a removable rear rack cross bar 56 is stored on the roadside frame 20 as illustrated in FIGS. 4–6. The front rack cross bar 52 is shown by itself in FIG. 16 with the middle rack cross bar 54 and rear rack cross bar 56 depicted in FIG. 17 as they are exact duplicates. All of the cross bars 52, 54 and 56 are preferably made of round tubular metal with the front rack cross bar 52 having integral offset brackets 52' that clip over, rest upon and enclose the front cargo rack arms 42 and 44 on three sides and each are held in place with a quick release pin 50 as shown in FIG. 4 and the pin 50 alone in FIG. 21.

The roadside frame 20 contains middle rack cross bar storage means in the form of pair of opposed sockets 58 each having a threaded shank hand knob 60 penetrating through the socket 58 abutting into the cross bar 54 or 56 for securement with two sockets 58 attached to each roadside frame 20 and curbside frame 22. A spring clip holder 62 is also attached to the roadside frame 20 and curbside frame 22 between the sockets 58.

It will be noted that the curbside frame 22 is an exact duplicate of the roadside frame 20 relative to the rack cross bar storage means while the middle rack cross bar 54, has been described as being stored on the curbside frame 22 since the middle and rear cross bars are identical either may be stored and become the middle or rear according to the position of the sockets 58 in which they are arbitrarily placed. One of the spring clip holders 62 is illustrated in FIG. 22 and a threaded shank hand knob 60 is shown alone in FIG. 20 with their functional utility obvious.

Front rack cross bar storage means consists of two opposed spring clip holders 62 attached to the curbside frame 22 that are spaced apart sufficiently to support each end of front rack cross bar 52 as illustrated in FIG. 5. FIG. 6 shows the cross bars 52, 54 and 56 extended with the quick release pin 50 and threaded shank hand knobs 60 attached.

A gas spring strut 64 is attached to each roadside and curbside frame 20 and 22, as shown in FIGS. 3–6, for ease of opening and to maintain the frames 20 and 22 in an open vertical position. Each gas spring strut 64 includes a ball stud 66 on each end with the bottom stud fastened to a strut bracket 68 for attachment directly to the pick-up truck bed 24. FIG. 18 illustrates the assembly and FIGS. 3–6 show the strut 64 attached to the frames 20 and 22. The frame attachment is achieved by placing the threaded portion of the upper ball stud 66 into an appropriate hole of a strut mounting bracket 78 that has been attached to the round tubular front member 46 and 46' as shown in FIGS. 4–8 with a standard nut holding the ball stud 66 in place.

Weather stripping 40 is also attached to the tonneau cover truck bed side rails 30 and 30' at the interface with the pick-up truck 24 with weather stripping 40 in the form of gaskets or the like provided where required to prevent leakage of rain and environmental conditions.

A cam lock 70 is provided to secure the tonneau cover 10 in the closed position. While the cam type of lock is preferred any type of conventional locking mechanism may be utilized with equal ease and dispatch.

A leveling foot 72 may optionally attached to each roadside frame and curbside frame 20 and 22 at the frames forward end to provide level contact with the pick-up truck bed 24. A typical leveling foot 72 is illustrated in FIG. 19 with any similar space adjusting device an acceptable substitute.

In function the paneled top assembly 12 is opened by unlocking the cam lock 70 and manually lifting each frame 20 and 22 with the help of the gas spring strut 64 exposing the interior of the truck bed 24. When desired, the carrying rack is formed by removing the quick release pin 50 from each cargo rack arm 42 and 44 and pivoting the arms outwardly until they are parallel with the frames at which time the pins 50 are replaced locking the arms in a forward position.

The front rack cross bar 52 is removed from its storage position in the spring clip holders 62 and disposed onto the forward portion of the extended first front cargo rack arm 42 and the second front cargo rack arm 44 then secured with a quick release pin 50 jointly through the front rack offset brackets 52' and the arms 42 and 44. The middle rack cross bar 54 and rear rack cross bar 56 are removed from their storage sockets 58 by backing out the threaded shank knobs 60 and replacing the cross bars 54 and 56 between the opened roadside frame 20 and curbside frame 22 within the appropriate sockets 58 then reinstalling the threaded shank knobs 60. When the crossbars 52, 54 and 56 are installed and secured the carrying rack is formed thereby providing means for transporting elongated objects above the pick-up truck cab and bed. Removal of the carrying rack is achieved in reverse order.

Figure 24:
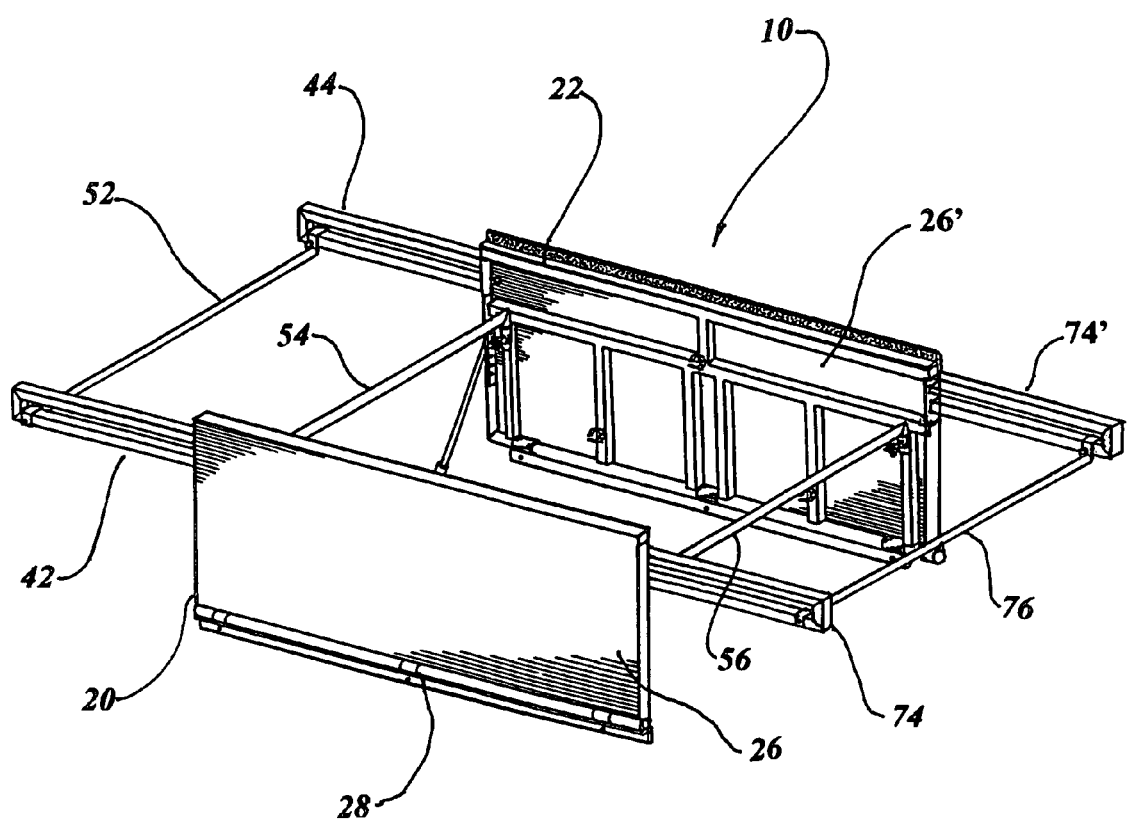
FIG. 24 is a partial isometric view of the hard tonneau cover and carrying rack in the second embodiment illustrating the cover open, the front cargo rack arm the rear cargo rack arm extended and all of the cross bars attached.

The second embodiment is illustrated in FIG. 24 and consists of the entire hard tonneau cover with a carrying rack 10 plus the addition of a duplicated rear first rack arm 74; a rear second rack arm 74' and a rear rack cross bar 76 positioned at the rear end of the tonneau cover for carrying extended length articles. The connections and pivotal arrangements are simply duplicated at the rear with the rear rack cross bar 76 stored on the roadside frame 20 in like manner as described above.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A hard tonneau cover with a carrying rack for a pick-up truck comprising,
   a roadside frame and a curbside frame each frame hinged to a side wall of a pick-up truck bed, pivoting upwardly in a clam shell manner for opening,
   means for transporting elongated objects above the pick-up truck cab and bed integrally formed within said roadside frame and a curbside frame having a plurality of removable cross bars, positioned between the roadside frame and curbside frame when pivoted into an open position, and
   a first front cargo rack arm pivotally attached to the roadside frame and a second front cargo rack arm pivotally attached to the curbside frame such that each arm may extend parallel with the corresponding roadside frame and curbside frame when the roadside frame and curbside frame are opened upward in a vertical position.

2. A hard tonneau cover for a pick-up truck comprising,
   a paneled top assembly defined as a roadside frame and a curbside frame with each frame hinged to a side wall of a pick-up truck bed, said paneled top pivoting upwardly in a clam shell manner for opening,
   an integral carrying rack formed within said top assembly having a plurality of removable cross bars, positioned between the roadside frame and curbside frame when the roadside frame and curbside frame are pivoted into an open vertical position providing means for transporting elongated objects above the pick-up truck cab and bed, and
   a first front cargo rack arm pivotally attached to the roadside frame and a second front cargo rack arm pivotally attached to the curbside frame such that each arm may extend parallel with the corresponding roadside frame and curbside frame when the roadside frame and curbside frame are opened upward in a vertical position.

3. A hard tonneau cover with a carrying rack for a pick-up truck comprising,
   a hinged roadside frame covered with a top panel and a hinged curbside frame covered with a top panel, the roadside frame and curbside frame mated parallel with each other deployed on top of a bed of the pick-up truck for closure and protection,
   a first front cargo rack arm pivotally attached to the roadside frame and a second front cargo rack arm pivotally attached to the curbside frame such that each arm may extend parallel with the corresponding roadside frame and curbside frame when the roadside frame and curbside frame are opened upward in a vertical position,
   a removable front rack cross bar, stored on the curbside frame, a removable middle rack cross bar, stored on the curbside frame, and a removable rear rack cross bar, stored on the roadside frame,
   said carrying rack formed with the front rack cross bar disposed between an extended first front cargo rack arm and an extended the second front cargo rack arm, the middle rack cross bar disposed between the opened roadside frame and an opened curbside frame and the rear rack cross bar disposed between the opened roadside frame and the opened curbside frame providing means for transporting elongated objects above the pick-up truck cab and bed, and
   a gas spring strut attached to the roadside frame and a gas spring strut attached to the curbside frame for maintaining the roadside frame and the curbside frame in an open vertical position.

4. The hard tonneau cover with a carrying rack for a pick-up truck as recited in claim 3 wherein said roadside frame and said curbside frame further comprises a rigid structural weldment made of a material selected from the group consisting of steel and aluminum, said roadside frame top panel and said curbside frame top panel comprise a material selected from the group consisting of sheet aluminum, sheet steel, thermoplastic and fiberglass.

5. The hard tonneau cover with a carrying rack for a pick-up truck as recited in claim 3 wherein said hinged roadside frame and said hinged curbside frame further comprises a hinge attached an outside edge portion of the roadside frame and the curbside frame to a corresponding truck bed side rail member.

6. The hard tonneau cover with a carrying rack for a pick-up truck as recited in claim 5 wherein said hinge further comprises said roadside frame and said curbside frame having a round tubular outside frame member forming a hinge pin and a plurality of tubular hinge bodies permanently attached to an angular structural member forming a hinge leaf with a bronze bushing in between.

7. The hard tonneau cover with a carrying rack for a pick-up truck as recited in claim 3 wherein said hinged curbside frame further comprises an overlapping tee shaped sealing member attached to an inboard longitudinal upper edge of the curbside frame for interfacing with the road side frame for providing a closure therebetween.

8. The hard tonneau cover with a carrying rack for a pick-up truck as recited in claim 3 wherein said roadside frame and said curbside frame further comprises means for storing said middle rack cross bar and means for storing said rear rack cross bar.

9. The hard tonneau cover with a carrying rack for a pick-up truck as recited in claim 8 wherein said means for storing said middle rack cross bar and means for storing said rear rack cross bar further comprises a pair of opposed sockets each having a threaded shank hand knob penetrating through for securement with the sockets attached to each roadside frame and curbside frame also a spring clip holder attached to each roadside frame and curbside frame between said sockets.

10. The hard tonneau cover with a carrying rack for a pick-up truck as recited in claim 3 wherein said curbside frame further comprises means for storing said front rack cross bar.

11. The hard tonneau cover with a carrying rack for a pick-up truck as recited in claim 10 wherein said means for storing said front rack cross bar further comprises two opposed spring clip holders spaced apart sufficiently to support each end of said front rack cross bar.

12. The hard tonneau cover with a carrying rack for a pick-up truck as recited in claim 3 further comprising means for storing said front cargo rack pivotal arm, defined as said roadside frame and said curbside frame each having a round tubular front member and said first cargo rack arm and second cargo rack arm each having a hollow tubular end configured to slip over the round tubular front member of the roadside frame and the curbside frame permitting the first cargo rack arm and second cargo rack arm to rotate in a pivotal manner.

13. The hard tonneau cover with a carrying rack for a pick-up truck as recited in claim 3 further comprising a quick release pin for locking each first pivotal front cargo rack arm and second pivotal front cargo rack arm to the corresponding roadside frame and said curbside frame.

14. The hard tonneau cover with a carrying rack for a pick-up truck as recited in claim 3 further comprising means for adjustably mounting said gas spring strut defined as a strut mounting bracket having a plurality of holes with a selected hole mated with the gas spring strut fittings.

15. The hard tonneau cover with a carrying rack for a pick-up truck as recited in claim 3 wherein said removable front rack cross bar is defined as a tubular bar with a offset bracket permanently attached onto each distal end configured to rest upon and enclose said first pivotal front cargo rack arm and said second pivotal front cargo rack arm on three sides.

16. The hard tonneau cover with a carrying rack for a pick-up truck as recited in claim 3 wherein each gas spring strut further comprises a ball stud mounted on each end of said gas spring strut with a bottom stud fastened to a strut bracket.

17. The hard tonneau cover with a carrying rack for a pick-up truck as recited in claim 3 further comprising weather stripping attached to the tonneau cover at an interface with the pick-up truck.

18. The hard tonneau cover with a carrying rack for a pick-up truck as recited in claim 3 further comprising a cam lock for securing the tonneau cover in a closed position.

19. The hard tonneau cover with a carrying rack for a pick-up truck as recited in claim 3 further comprising a leveling foot adjustably attached to each roadside frame and curbside frame at a forward end for providing level contact with the pick-up truck.

20. The hard tonneau cover with a carrying rack for a pick-up truck as recited in claim 3 further comprising a rear first rack arm and a rear second rack arm and a rear rack cross bar positioned at the rear of said tonneau cover for carrying extended length articles.

* * * * *